United States Patent [19]

Merrell et al.

[11] Patent Number: 4,514,761
[45] Date of Patent: Apr. 30, 1985

[54] DATA ENCRYPTION TECHNIQUE FOR SUBSCRIPTION TELEVISION SYSTEM

[75] Inventors: Richard G. Merrell, Hebron; Fredreck H. Auld, Glenview, both of Ill.

[73] Assignee: Zenith Electronics Corporation, Glenview, Ill.

[21] Appl. No.: 410,801

[22] Filed: Aug. 23, 1982

[51] Int. Cl.³ ............................ H04N 7/16; H04K 1/04
[52] U.S. Cl. .................................. 358/122; 358/117; 358/123; 358/124
[58] Field of Search ............... 358/122, 123, 124, 117, 358/120

[56] References Cited

U.S. PATENT DOCUMENTS

| | | | |
|---|---|---|---|
| 3,746,799 | 7/1973 | Gentges | 358/122 |
| 3,824,332 | 7/1974 | Horowitz | 358/124 |
| 3,919,462 | 11/1975 | Hartung et al. | 358/124 |
| 4,068,264 | 1/1978 | Pires | 358/122 |
| 4,081,832 | 3/1978 | Sherman | 358/124 |
| 4,222,068 | 9/1980 | Thompson | 358/120 |
| 4,292,650 | 9/1981 | Hendrickson | 358/122 |
| 4,388,643 | 6/1983 | Aminetzah | 358/122 |
| 4,460,922 | 7/1984 | Ensinger et al. | 358/122 |

Primary Examiner—S. C. Buczinski

[57] ABSTRACT

A subscription television system includes a head-end for transmitting selected fields of a television signal in a scrambled form, the scrambled fields being identified by an encrypted mode control code inserted in a selected horizontal line of the preceding vertical interval. The mode control code is formed such that a predetermined non-transmitted control code is realized when the mode control code is processed with vertical interval system control data according to a selected function. A decoder processes the received mode control code and system control data according to the selected function to reconstitute the predetermined control code for enabling unscrambling of the following field. The decoder may employ majority voting techniques whereby not all of the bits of the reconstituted control code need be properly recovered to enable the unscrambling function.

8 Claims, 6 Drawing Figures

|  | BITS | BIT 16 | BIT 17 | BIT 18 | FOR INVERTED VIDEO FIELD | | |
|---|---|---|---|---|---|---|---|
|  |  |  |  |  | $Q_A$ | $Q_B$ | $Q_C$ |
|  | HL 10 | 0 | 1 | 0 | 0 | 1 | 0 |
|  | HL 11 | 0 | 0 | 0 | 0 | 1 | 0 |
|  | HL 12 | 1 | 0 | 0 | 1 | 1 | 0 |
|  | HL 13 | 1 | 0 | 1 | 0 | 1 | 1 |
| EXCLUSIVE-OR |  | 0 | 1 | 1 |  |  |  |

Fig. 3

| BITS | A | B | C | D | E | |
|---|---|---|---|---|---|---|
|  | 1 | 0 | 1 | 0 | 1 | }  |
|  | 1 | 0 | 1 | 0 | 1 | } INVERTED |
|  | 1 | 1 | 1 | 0 | 1 | }  |
|  | 1 | 1 | 0 | 1 | 1 | }  |
|  | 1 | 1 | 1 | 1 | 1 | } NON-INVERTED |
|  | 0 | 1 | 0 | 1 | 1 | }  |
|  | 0 | 0 | 1 | 1 | 0 | }  |
|  | 0 | 1 | 1 | 1 | 0 | } INVERTED |
|  | 1 | 0 | 0 | 1 | 0 | }  |
|  | 0 | 1 | 0 | 0 | 0 | }  |
|  | 1 | 1 | 1 | 0 | 0 | } NON-INVERTED |
|  | 1 | 0 | 1 | 0 | 0 | }  |

Fig. 4

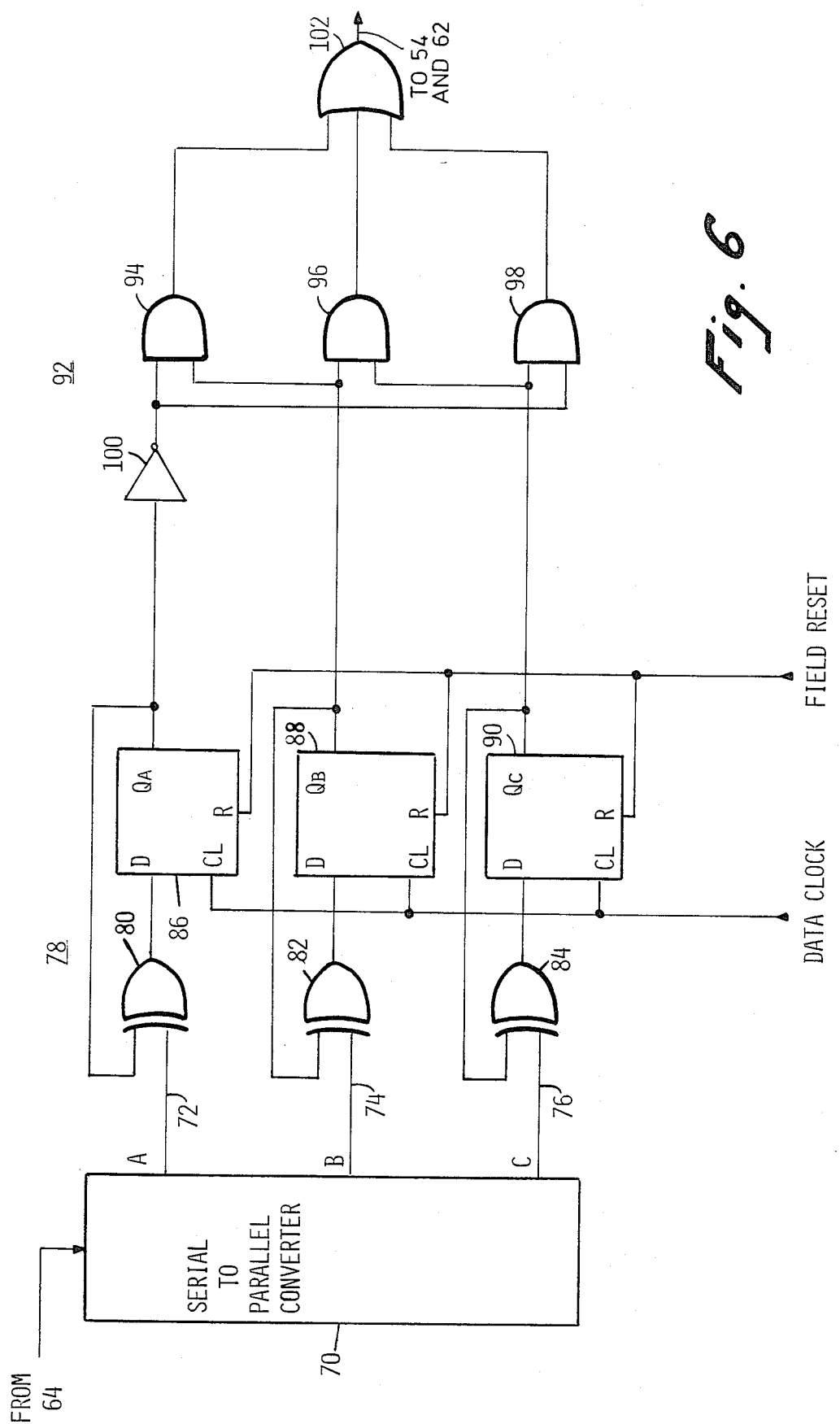

DATA ENCRYPTION TECHNIQUE FOR SUBSCRIPTION TELEVISION SYSTEM

BACKGROUND OF THE INVENTION

The present invention relates generally to subscription television systems and, more particularly, to an improved technique for encrypting a transmitted mode control signal which identifies, for example, whether the video fields of a subscription television signal are being transmitted in a normal or in an inverted form.

In subscription television systems, television signals are typically transmitted to system subscribers in a scrambled form either along a coaxial cable or as an "over-the-air" broadcast. Each system subscriber is provided with a decoder operable for unscrambling the transmitted television signal and for supplying the unscrambled signal to a conventional television receiver for viewing. In addition, many current subscription television systems are addressable in nature whereby the operation of individual decoders may be selectively controlled through the transmission of system control data generated at the system head-end. The system control data, which is typically encoded in selected horizontal lines of the vertical blanking interval of the transmitted television signal, usually includes such information as subscriber address codes, subscriber authorization codes, program codes and the like enabling the system operator to designate different levels of programming authorized for different individual subscribers. See, for example, U.S. Pat. No. 4,460,922, entitled Memory Select System for an STV Decoder, which describes the use of such system control data in detail.

A known technique for scrambling a subscription television signal contemplates inverting randomly selected fields of a broadcast television signal such that the reproduced video display on a standard television receiver is caused to alternate between normal and inverted or negative images. U.S. Pat. No. 4,222,068 to Thompson discloses a subscription television system exemplary of this type of video scrambling. In the Thompson system, a mode control signal in the form of an inverted polarity horizontal line is transmitted during each vertical blanking interval immediately preceding the transmission of each inverted video field to enable decoding thereof by authorized system subscribers. In particular, the decoder of an authorized subscriber is responsive to each transmitted mode control signal for re-inverting the immediately succeeding video field of the received television signal and is responsive to the absence of a mode control signal for developing the immediately succeeding video field in an unmodified form. As a result, the decoder is operable for unscrambling the transmitted television signal which may then be coupled to a standard television receiver for viewing.

As explained above, the mode control signal used in the Thompson system to identify an inverted video field consists of a selected horizontal line of the preceeding vertical blanking interval whose polarity has been inverted. Although this mode control signal is relatively easy to detect for providing increased confidence in proper decoder operation, its ease of detection also facilitates unauthorized decoding of the scrambled signal by a would-be pirate. That is, by simply detecting the polarity of the selected horizontal line comprising the mode control signal, a would-be pirate can quite easily duplicate the operation of an unauthorized decoder to unscramble the transmitted television signal.

While the prior art discloses numerous techniques for encrypting mode control signals of the type used in the Thompson system to deter the would-be pirate, such attempts have not proven altogether satisfactory. For example, U.S. Pat. No. 3,824,332 to Horowitz discloses a subscription television system wherein coding bursts are added to the composite television signal to indicate whether the subsequent video field is inverted. U.S. Pat. No. 4,068,264 to Pires discloses the use of randomly generated binary code number signals as mode control signals. U.S. Pat. No. 3,919,462 to Hartung et al discloses the use of a mode control signal which is coded in binary digital form as a series of pulses. Finally, U.S. Pat. No. 4,081,832 to Sherman discloses a television system wherein a decoder is operated for re-inverting video signals in response to information contained on a punch card inserted in a suitable card reader.

It is accordingly a primary object of the present invention to provide an improved technique for encrypting a mode control signal for use in a subscription television system.

It is a more specific object of the invention to provide a subscription television system characterized by a mode control signal which is encrypted such that the bits of the transmitted mode control signal define a predetermined inversion control code when processed according to a selected function with selected bits of the transmitted system control data.

It is a further object of the invention to provide a decoder for use in a subscription television system for recovering the predetermined inversion control code from the transmitted mode control signal and for enabling unscrambling of the accompanying television signal on a majority voting basis wherein unscrambling is enabled in response to the majority of bits of the recovered inversion control code coinciding with the corresponding bits of the predetermined inversion control code.

It is yet another object of the invention to provide a subscription television system wherein a transmitted mode control signal is characterized by a plurality of illusory data bits adapted to deter unauthorized decoding of subscription television programs.

BRIEF DESCRIPTION OF THE DRAWINGS

Features of this invention which are believed to be novel are set forth with particularity in the appended claims. The invention, together with its objects and the advantages thereof, may best be understood by reference to the following description taken in conjunction with the accompanying drawings in which;

FIGS. 3 and 4 illustrate various bit patterns of the encoded data of FIG. 2 according to the data encryption techniques of the present invention;

FIG. 6 is a schematic diagram illustrating the mode control logic of the decoder of FIG. 5.

DESCRIPTION OF THE PREFERRED EMBODIMENT

Figure 1:
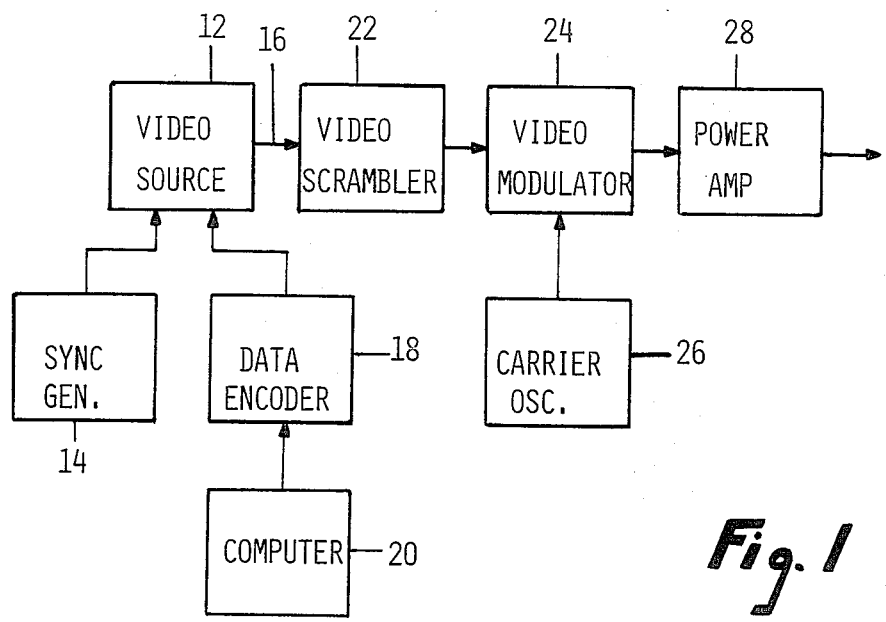
FIG. 1 is a general block diagram showing the video portion of a subscription television signal transmitter.

Referring now to the drawings and, in particular, to FIG. 1, there is shown a subscription television signal transmitter adapted for transmitting television signals for use in either an "over-the-air" pay television system or in a cable television system. The transmitter comprises a video channel, the associated audio channel not being shown, which includes a video signal source 12 responsive to a sync generator 14 for developing a conventional baseband video signal in either a normal or inverted form on an output conductor 16. Video signal source 12 also receives an input from a data encoder 18 which develops appropriately band-limited digitally encoded serial data signals for insertion in one or more unused horizontal lines of the vertical blanking interval of the composite video signal developed on conductor 16. The digitally encoded signals, which include system control data enabling the system operator to control the program authorization of the individual subscribers and a mode control code identifying whether the succeeding video field is being transmitted in a normal or inverted form, are generated by data encoder 18 in response to information supplied by a computer 20.

Figure 2:
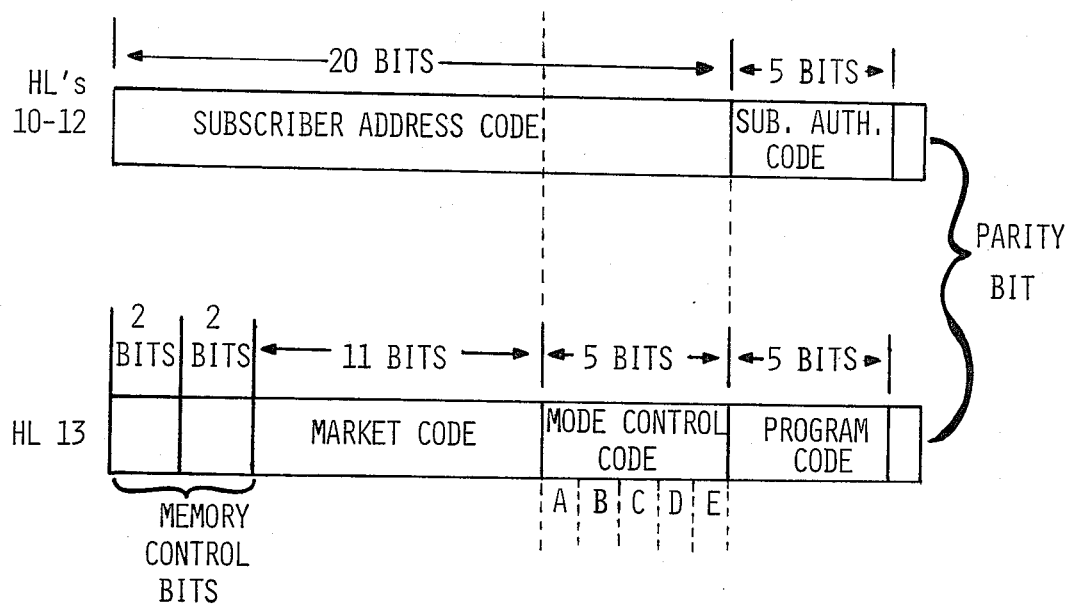
FIG. 2 graphically illustrates the format of the data encoded into several horizontal scanning lines of the vertical intervals of the television signal produced by the transmitter of FIG. 1.

While the transmitted system control data may take various forms, a specific exemplary format is illustrated in FIG. 2. This data format is explained in detail in the previously mentioned co-pending application but will be summarized herein for purposes of completeness. In this exemplary format, horizontal lines 10 thru 13 of each vertical interval of the baseband video signal developed on conductor 16 are each used to transmit 26 bits of information. The first 20 bits of each of horizontal lines 10-12 are reserved for the transmission of a subscriber address code which identifies a particular system subscriber and his associated decoder. A 5-bit subscriber authorization code is then transmitted after each subscriber address code followed by a single parity bit. The subscriber authorization code is used to selectively set the decode authorization status of the subscriber identified by the subscriber address code transmitted during the same horizontal line. Therefore, the decode authorization status of three different subscribers may be selectively set during each field of the video signal developed on conductor 16. Horizontal line 13 is used to transmit a number of system control codes including a 2-bit write-RAM select code, a 2-bit read-RAM select code, an 11-bit market code and a 5-bit program code. The write and read-RAM select codes direct the operation of the subscriber's decoder memories while the 5-bit program code is used to transmit encoded data identifying the program category or tier of the accompanying television signal. In addition, bit positions 16-20 of horizontal line 13 of each vertical blanking interval are used to transmit a 5-bit mode control signal developed according to the present invention, the 5 bits of the mode control signal being identified by the letters A-B-C-D-E.

With further reference to FIG. 1, the composite baseband video signal developed on conductor 16, together with the system control date and the mode control code encoded in the vertical intervals thereof are applied to a video scrambler 22 which may be used to impose an additional level of scrambling on the television signal. For example, video scrambler 22 may be used to modify the baseband television signal developed on conductor 16 by suppressing the amplitude of randomly selected horizontal blanking and synchronization pulses during the fields of the video signal. The encoded and scrambled baseband video signal is coupled from video scrambler 22 to a video modulator 24 for amplitude modulating an RF carrier signal developed by a carrier oscillator 26, the resulting amplitude modulated signal being amplified by a power amplifier 28 prior to transmission.

FIGS. 3 and 4 illustrate the technique of the present invention for encrypting the mode control code transmitted during horizontal line 13 of each vertical blanking interval of the transmitted television signal. It will be recalled that the transmitted mode control signal is used to identify whether the succeeding video field is being transmitted in a normal or an inverted form to facilitate proper decoding of the scrambled television signal. In this regard, while the data encryption technique of the invention is being described in relation to a mode control signal identifying whether the succeeding video field is being transmitted in a normal or an inverted form, it will be appreciated that similar data encryption techniques can be used in the development of a mode control code identifying other modified characteristics of a transmitted video signal.

With specific reference to FIG. 3, according to one aspect of the data encryption technique of the present invention, the mode control code transmitted during horizontal line 13 is developed by initially selecting a predetermined inversion control code for identifying an inverted video field. Each bit of the transmitted mode control code developed on horizontal line 13 is then derived by determining the logic state (i.e. logic 1 or logic 0) which when processed according to a selected function with the logic signals occupying corresponding bit positions in the system control data of horizontal lines 10-12 yields a logic signal having a state coinciding with the state of the corresponding bit of the predetermined inversion control code. In a preferred embodiment of the invention, the selected function comprises an EXCLUSIVE-OR function. It will be appreciated that since the system control data in horizontal lines 10-12 typically represents a continually changing data pattern, the mode control code transmitted during horizontal line 13 will likewise form a continually changing data pattern which will be extremely difficult for a pirate to decipher.

An example of the foregoing technique is illustrated in FIG. 3. In this example, bits A, B and C of horizontal line 13 (i.e. the logic signals characterizing bit position 16-18) are being used to form the transmitted mode control code with the state of the predetermined inversion control code being selected as 0-1-1. Accordingly, bit A of the mode control code developed on horizontal line 13 is selected such that the EXCLUSIVE-OR combination of the 16th bit of each of horizontal lines 10-13 yields a signal having a logic state of 0. Thus, bit A of the mode control code is transmitted as a logic 1 signal since the EXCLUSIVE-OR combination of logic 0 (bit 16 of horizontal line 10), logic 0 (bit 16 of horizontal line 11), logic 1 (bit 16 of horizontal line 12) and logic 1 (bit 16 of horizontal line 13) yields a logic 0 corresponding to the state of the first bit of the predetermined inversion control code. In a similar manner, bit B of the mode control code (the 17th bit of horizontal line 13) will be transmitted as a logic 0 signal and bit C (the 18th bit of horizontal line 13) will be transmitted as logic 1.

If, at any time, the logic states of the system control data bits on horizontal lines 10-12 change, e.g. for addressing different system subscribers, the logic levels of the transmitted mode control data bits A–C will normally also change to maintain the EXCLUSIVE-OR relationship therebetween. For example, if system control data bits 16–18 of horizontal line 10 change to 1-0-1, the mode control data bits A–C transmitted during horizontal line 13 will assume the logic states 0-1-0 to maintain the EXCLUSIVE-OR relationship yielding the predetermined inversion control code 0-1-1. Thus, as the system control data bits change, for example to address different subscribers, so will the transmitted mode control bits A–C change making it extremely difficult to decipher the transmitted code except by an authorized decoder. In this regard, it will be appreciated that the predetermined inversion control code, 0-1-1 in the foregoing example, is not actually transmitted but rather is used as a key or benchmark in determining the states of the transmitted mode control bits A–C.

According to another aspect of the invention, the remaining 2 bits D and E of the transmitted mode control code are used to further deter a would-be pirate from deciphering the code. This is achieved by configuring the bits D and E for exhibiting a first characteristic when the succeeding video field is to be transmitted in an inverted form and a second characteristic when the succeeding video field is to be transmitted in a non-inverted form and then changing these characteristics at some later time. Thus, an illusion is initially created by the regular pattern of the mode control bits D and E which is likely to lead the pirate to assume that he has discovered the key to the mode control code. Any unauthorized decoders designed on the basis of this illusion will be rendered useless when the mode control bits D and E are subsequently changed.

An example of this illusion creating technique is illustrated in FIG. 4. In this example, bits A–C of the transmitted mode control code are determined as previously described in relation to FIG. 3. It will be recalled that these bits represent continually changing logic states so that no readily recognizeable pattern is discernable. Now, assume that mode control bits D and E are caused to assume states 0-1 or 1-0 when the succeeding video field is to be inverted and states 0-0 or 1-1 when the succeeding video field is to be transmitted in a non-inverted form. Due to the regular pattern characterizing bits D and E it is reasonable to assume that a pirate studying these bits will be led to the conclusion that he has discovered the key to the mode control code. That is, when bits D and E are logical 0-1 or 1-0 the succeeding video field will presumptively be inverted and when they are 0-0 or 1-1 the succeeding video field will be presumptively transmitted in a non-inverted form. This pattern can be changed at a later date by operating encoder 18 for causing bits D and E to follow a random pattern or, alternately, to represent the opposite conditions they originally represented. As a result, any unauthorized decoders which were provided on the basis of the original pattern would be rendered worthless but authorized decoders, which ignore mode control bits D and E, would not be affected.

Figure 5:
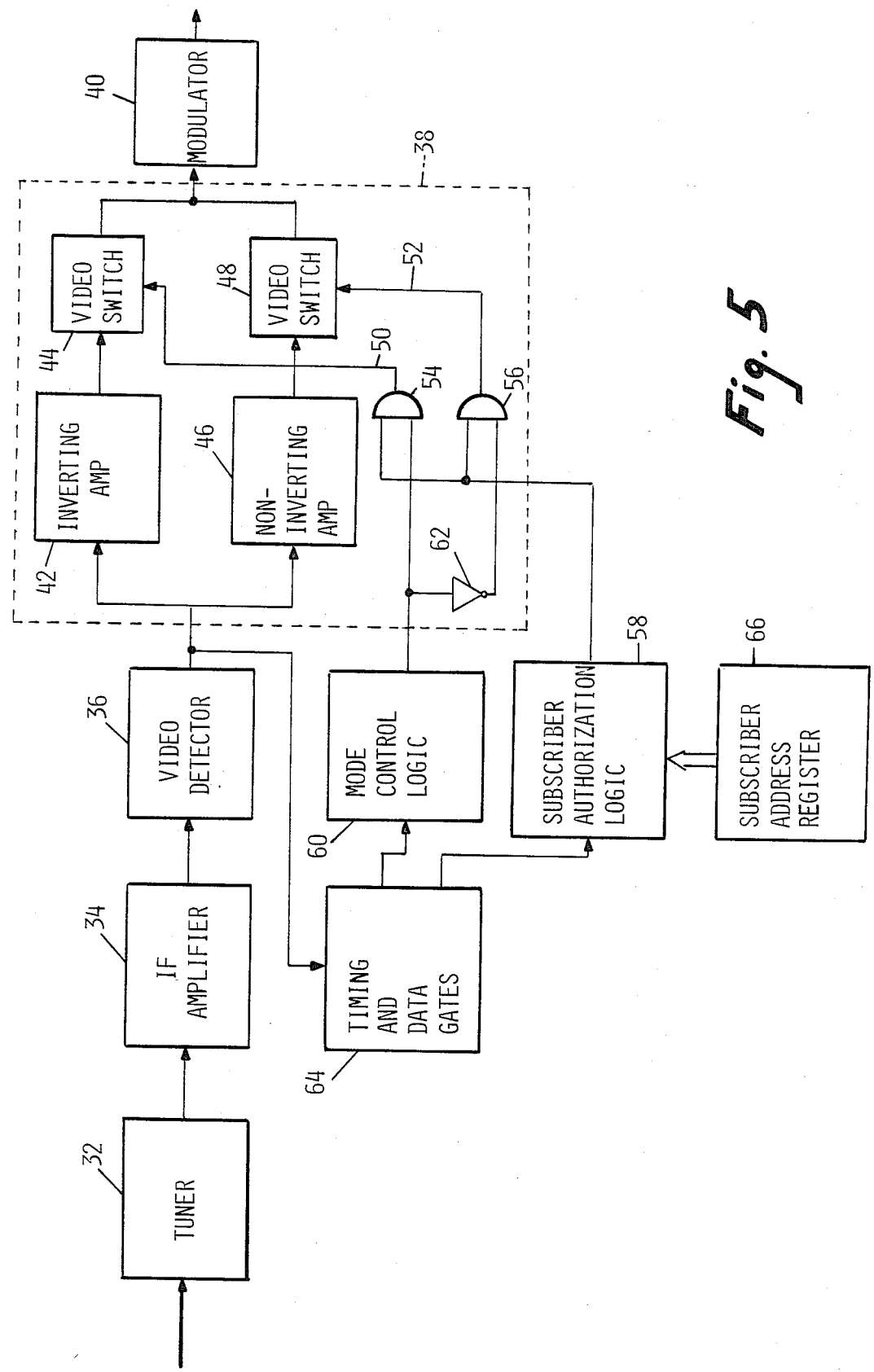
FIG. 5 is a block diagram illustrating a decoder operable for unscrambling a television signal produced by the transmitter of FIG. 1.

FIG. 5 illustrates in block diagram form a decoder adapted for use in association with the subscription television system of the present invention. The decoder comprises a tuner 32 which converts a received RF television signal to an intermediate frequency signal which is coupled through an intermediate frequency amplifier 34 to the input of a video detector 36. The output of video detector 36 comprises a composite baseband video signal corresponding to the baseband signal developed at the output of video scrambler 22 of the transmitter shown in FIG. 1.

The scrambled baseband video signal developed at the output of video detector 36 is coupled through an unscrambler 38, amplitude modulates a standard RF television carrier (typically a channel 3 or channel 4 carrier) in a modulator 40 and is coupled therefrom to the antenna terminals of the subscriber's television receiver for viewing. Unscrambler 38 comprises a first video path comprising an inverting amplifier 42 and a first video switch 44 connected in series between video detector 36 and modulator 40 and a second video path comprising a non-inverting amplifer 46 and a second video switch 48 also connected in series between video detector 36 and modulator 40. Video switches 44 and 48 are enabled in response to logic 1 signals developed on control conductors 50 and 52 respectively for establishing either the first or second video path between video detector 36 and modulator 40. Thus, unscrambling of the video signal is achieved by enabling video switch 44 in response to an inverted video field and by enabling video switch 48 in response to a non-inverted video field.

Control lines 50 and 52 are derived at the outputs of a pair of respectve AND gates 54 and 56. One input of each of AND gates 54 and 56 is supplied from the output of a subscriber authorization logic circuit 58. The second input of gate 54 is supplied directly from the output of a mode control logic circuit 60 while the second input of gate 56 is supplied from the output of mode control logic circuit 60 through an inverter 62. A timing and data gate circuit 64 is operable for coupling the system control data transmitted during horizontal lines 10–13 from the output of video detector 36 to the input of subscriber authorization logic circuit 58 and for coupling bits A–C of the mode control code transmitted during horizontal line 13 to the input of mode control logic circuit 60. The subscriber authorization logic circuit 58 is responsive to the system control data and to the decoder's address stored in a register 66 for developing a logical 1 decode authorization signal at its output for enabling gates 54 and 56 if the subscriber is authorized for decoding the received program. Mode control logic circuit 60 is operable for decoding bits A–C of the transmitted mode control code to selectively enable either video switch 44 or video switch 48 depending upon whether the succeeding video field is being transmitted in an inverted or non-inverted form. In particular, mode control logic circuit 60 develops a logical 1 output if the succeeding video field is being transmitted in an inverted form for enabling video switch 44 and disabling video switch 48. The inverted video field, re-inverted by inverting amplifier 42, is passed to modulator 40 by video switch 44. On the other hand, a logic 0 output is developed by mode control logic circuit 60 when the succeeding video field is transmitted in a non-inverted form. The logic 0 output of mode control logic circuit 60 enables video switch 48 while disabling video switch 44. As a consequence, non-inverted video fields will be passed to modulator 40 in an unmodified form.

FIG. 6 is a logic diagram illustrating an exemplary embodiment of mode control logic circuit 60. The circuit includes a serial to parallel converter 70 for converting the first three serially transmitted bits A, B and C of the mode control code to respective parallel outputs on a series of conductors 72, 74 and 76. The received mode control bits A, B and C are applied from parallel conductors 72, 74 and 76 to a decoding circuit 78 which decodes the transmitted mode control bits to reconstruct either the predetermined inversion control code representing that the subsequent video field is inverted or another code selected for representing a non-inverted video field. More specifically, decoding circuit 78 comprises three EXCLUSIVE-OR gates 80, 82 and 84 each receiving at one input a respective one of the mode control bits A, B or C developed on conductors 72, 74 and 76. The second input of each gate 80, 82 and 84 is derived from the Q output of a respective D-type flip/flop 86, 88 and 90, the D-input of each flip/flop supplied from the ouptut of a respective one of the gates 80, 82 and 84. Each flip/flop further includes a reset input which is supplied with a field rate reset signal which occurs prior to the mode control bits A, B and C and a clock input for clocking the flip/flops at the horizontal line rate.

Assume, for example, that the predetermined inversion control code selected to represent an inverted video field is 0-1-1 as in the previous example and that a non-inversion control code of 1-0-0 is selected to represent a non-inverted video field. It will be appreciated that neither of the latter two codes are actually transmitted but are used as a basis from which to derive a mode control code for transmission which represents either an inverted or non-inverted video field. For the system control data transmitted during bit positions 16–18 of horizontal lines 10–12 shown by way of example in FIG. 3, the predetermined inversion control code representing inversion of the subsequent video field (i.e. 0-1-1) would be transmitted as 1-0-1 during bit positions A, B and C of horizontal line 13 and the non-inversion control code (i.e. 1-0-0) would be transmitted as 0-1-0 during bit positions A, B and C of horizontal line 13.

Referring initially to the case where a video field is transmitted in inverted form, flip/flops 86, 88 and 90 are initially reset at the beginning of the vertical interval preceeding the inverted video field thereby causing the $Q_A$–$Q_C$ outputs of flip/flops 86, 88 and 90 to assume a logical 0 state. Bits 16–18 of horizontal line 10 (see FIG. 3) are subsequently developed on conductor 72, 74 and 76 whereby these conductors assume the states 0-1-0 respectively. In response to the development of a clocking signal, the outputs $Q_A$–$Q_C$ of flip/flops 86, 88 and 90 assume the states 0-1-0 respectively as shown in FIG. 3. Bits 16–18 of horizontal line 11 are next developed on conductors 72, 74 and 76 and in response to the next clock signal, result in outputs $Q_A$–$Q_C$ of flip/flops 86, 88 and 90 assuming the states 0-1-0. In a similar manner, bits 16–18 of horizontal line 12 will subsequently cause the $Q_A$–$Q_C$ outputs of the flip/flops to assume states 1-1-0 respectively. Finally, bits A–C of the transmited mode control code will next cause the $Q_A$–$Q_C$ outputs of the flip/flops to assume the states 0-1-1 respectively which correspond to the predetermined inversion control code representing that the subsequently transmitted video field is to be in an inverted form. This code is further decided by a majority voting logic circuit 92 for developing a logic 1 signal at the output of mode control circuit 60 enabling video switch 44 and disabling video switch 48 as previously described.

In the case where a video field is to be transmitted in a non-inverted form, the selected non-inversion control code (1-0-0) is transmitted during bit positions A, B and C of horizontal line 13 as 0-1-0 in accordance with the EXCLUSIVE-OR determining technique previously described. In a manner similar to that described above, the selected non-inversion control code 1-0-0 will have been reconstructed at the $Q_A$–$Q_C$ outputs of flip/flops 86, 88 and 90 after bits A, B and C of horizontal line 13 have been processed by decoding circuit 78. This code is decoded by majority voting logic circuit 92 for developing a logic 0 signal at the output of mode control logic circuit 60 enabling video switch 48 and disabling video switch 44 as previously described.

Majority voting logic circuit 92 includes three AND gates 94, 96 and 98, an inverter 100 and an output OR gate 102. OR-gate 102 develops a logic 1 signal at its output of whenever at least two of the three logic signals developed on the $Q_A$–$Q_C$ outputs of flip/flops of 86, 88 and 90 correspond to bits A, B and C of the predetermined inversion control code, i.e. 0-1-1. Thus, even if one of the three transmitted mode control bits is improperly decoded, a logic 1 signal is nevertheless developed at the output of OR-gate 102 placing unscrambler 38 in its proper inverting mode of operation. In this regard, it will be appreciated that for majority voting logic circuit 92 to operate properly, the selected inversion and non-inversion control codes must exhibit a complementary relationship. Thus, the non-inversion control code 1-0-0 is the complement of the inversion control code 0-1-1.

As an example, assume initially that a transmitted mode control code representing that the subsequent video field is to be inverted is properly decoded so that the $Q_A$–$Q_C$ outputs of the flip/flops assume the states 0-1-1 respectively. As a result, all three AND-gates 94, 96 and 98 will be conductive and a logic 1 signal will be developed at the output of OR-gate 102. On the other hand, if one bit of the transmitted code is decoded improperly such that, for example, the $Q_A$–$Q_C$ outputs of the flip/flops assume the states 0-1-0 (instead of 0-1-1), only AND-gate 94 will be rendered conductive but, the output of OR-gate 102 will nevertheless be driven to logical 1 as required. It can easily be verified that a similar result is achieved so long as at least any two of the predetermined inversion control code bits are properly decoded at the $Q_A$–$Q_C$ outputs of flip/flops 86, 88 and 90 are in any other state a logic 0 signal will be developed at the output of OR-gate 102 placing unscrambler 38 in its non-inversion mode of operation.

The use of majority voting logic circuit 92 further facilitates encryption of the transmitted mode control signal by allowing for the use of four different codes which may be changed from time to time to represent an inverted video field. For example, majority voting logic circuit 92 of FIG. 6 will produce a logic 1 output representing an inverted video field in response to the codes 0-1-1, 0-0-1, 0-1-0 and 1-1-1. When the system is operated in this mode, it is preferably to provide additional means for insuring the integrity of the data bits developed at the outputs of flip/flops 86, 88 and 90.

While there has been described a particular embodiment of the present invention, it will be apparent that changes and modifications may be made therein without departing from the invention in its broader aspects. The aim of the appended claims, therefore, is to cover all such changes and modifications as fall within the true spirit and scope of the invention.

What is claimed is:

1. A subscription television system comprising:
   head-end means including means for transmitting selected fields of a television signal in a scrambled form, means for inserting a plurality of system control data bits in each of a plurality of horizontal lines of the vertical blanking intervals of said transmitted television signal, said system control data bits being variable from horizontal line to horizontal line and from field to field of said transmitted television signal, and means for inserting a plurality of mode control data bits forming a mode control code in a selected horizontal line of the vertical blanking intervals of said transmitted television signal, said mode control data bits being adapted for processing with selected ones of said system data bits according to a selected function for yielding a non-transmitted predetermined control code when the immediately following field of said television signal is transmitted in said scrambled form and for yielding another code when the immediately following field of said television signal is not transmitted in said scrambled form; and decoding means including means for receiving said transmitted television signal, logic means for processing the received mode control data bits and the received selected system data bits in accordance with said selected function for deriving said predetermined control code and said other code and means responsive to said derived predetermined control code for enabling unscrambling of the following field of said received television signal.

2. A subscription television system according to claim 1 wherein said derived codes comprise complementary M bit codes and wherein said decoding means comprises means responsive to P bits of one of said derived codes being equal to the corresponding P bits of said predetermined control code for enabling unscrambling of the following field of said received television signal, where P is less than M, whereby said predetermined control code may comprise any one of a plurality of different M bit codes.

3. A subscription television system according to claim 1 wherein said mode control code comprises N mode control data bits each defining a respective time interval of said selected horizontal line and wherein said selected system data bits comprise the N system data bits occurring in the corresponding time intervals of each of said plurality of horizontal lines.

4. A subscription television system according to claim 3 wherein said selected function comprises an EXCLUSIVE-OR function wherein each of said mode control data bits is selected for EXCLUSIVE-OR processing with the selected system data bits occurring in corresponding time intervals of said horizontal lines for yielding said predetermined control code.

5. A subscription television system according to claim 1 wherein said head-end means includes means for inserting a predetermined number of illusory data bits in each of said selected horizontal lines to which said decoding means is unresponsive, said illusory data bits having a given characteristic when the immediately following field of said television signal is to be transmitted in said scrambled form and having a different characteristic when the immediately following field of said television signal is not to be transmitted in said scrambled form for creating the illusion that said given and different characteristics define whether the immediately following field of said television signal is to be transmitted in said scrambled form; and means for selectively changing said given and different characteristics so as to deter unauthorized unscrambling of said transmitted television signal.

6. A decoder for use in a subscription television system including head-end means for transmitting selected fields of a television signal in a scrambled form, means for inserting a plurality of system control data bits in each of a plurality of horizontal lines of the vertical blanking intervals of said transmitted television signal, said system control data bits being variable from horizontal line to horizontal line and from field to field of said transmitted television signal, and means for inserting a plurality of mode control data bits forming a mode control code in a selected horizontal line of the vertical blanking intervals of said transmitted television signal, said mode control data bits being adapted for processing with selected ones of said system data bits according to a selected function for yielding a non-transmitted predetermined control code when the immediately following field of said television signal is transmitted in said scrambled form and for yielding another code when the immediately following field of said television signal is not transmitted in said scrambled form said decoder comprising:

means for receiving said transmitted signal;

logic means for processing the received mode control data bits and the received selected system data bits in accordance with said selected function for deriving said predetermined control code and said other code; and means responsive to said derived predetermined control code for enabling unscrambling of the following field of said received television signal.

7. A decoder according to claim 6 wherein said derived codes comprise complementary M bit codes and wherein said decoding means comprises means responsive to P bits of one of said derived codes being equal to the corresponding P bits of said predetermined control code for enabling unscrambling of the following field of said received television signal, where P is less than M, whereby said predetermined control code may comprise any one of a plurality of different M bit codes.

8. A decoder according to claim 6 wherein said mode control code comprises N mode control data bits each defining a respective time interval of said selected horizontal line, said selected system data bits comprising the N system data bits occurring in the corresponding time intervals of each of said plurality of horizontal lines, and wherein said selected function comprises an EXCLUSIVE-OR function, said decoding means including means for EXCLUSIVE-OR processing each of said mode control data bits with the selected system data bits occurring in corresponding time intervals of said horizontal lines for deriving said predetermined control code.

* * * * *